US006336116B1

(12) United States Patent
Brown et al.

(10) Patent No.: US 6,336,116 B1
(45) Date of Patent: Jan. 1, 2002

(54) SEARCH AND INDEX HOSTING SYSTEM

(76) Inventors: Ryan Brown, 3674 Lincoln Rd., Santa Barbara, CA (US) 93110; Emmanuel Roche, 64 Livermore St., Belmont, MA (US) 02178; Yves Schabes, 770 Boylston #12B, Boston, MA (US) 02199

( * ) Notice: Subject to any disclaimer, the term of this patent is extended or adjusted under 35 U.S.C. 154(b) by 0 days.

(21) Appl. No.: 09/130,420

(22) Filed: Aug. 6, 1998

(51) Int. Cl.[7] .................................................. G06F 17/30
(52) U.S. Cl. ................................ 707/10; 707/3; 709/218
(58) Field of Search .................................. 707/2, 3, 4, 7, 707/9, 10, 501, 513; 709/219, 218, 217, 223, 203

(56) References Cited

U.S. PATENT DOCUMENTS

| 5,732,219 A | * | 3/1998 | Blumer et al. ............... 709/227 |
| 5,745,890 A | | 4/1998 | Burrows ........................... 707/3 |
| 5,764,906 A | * | 6/1998 | Edelstein et al. ............ 709/219 |
| 5,778,367 A | * | 7/1998 | Wesinger, Jr. et al. ........ 707/10 |
| 5,793,966 A | * | 8/1998 | Amstein et al. |
| 5,848,410 A | * | 12/1998 | Walls et al. ....................... 707/4 |
| 5,913,210 A | * | 6/1999 | Call .................................. 707/4 |
| 5,920,859 A | * | 7/1999 | Li ..................................... 707/5 |
| 5,961,593 A | * | 10/1999 | Gabber et al. ............... 709/219 |
| 5,974,455 A | * | 10/1999 | Monier .......................... 709/223 |
| 5,978,842 A | * | 11/1999 | Noble et al. ................. 709/218 |
| 5,982,370 A | * | 11/1999 | Kamper .......................... 345/356 |
| 5,987,454 A | * | 11/1999 | Hobbs .............................. 707/4 |
| 6,021,433 A | * | 2/2000 | Payne et al. .................. 709/219 |
| 6,044,372 A | * | 3/2000 | Rothfus et al. ................. 707/10 |
| 6,085,229 A | * | 7/2000 | Newman et al. ............. 709/203 |
| 6,094,649 A | * | 7/2000 | Bowen et al. .................... 707/3 |

FOREIGN PATENT DOCUMENTS

| EP | 0 530 993 | 3/1993 |
| WO | WO 98/07105 | 2/1998 |

OTHER PUBLICATIONS

Koster, Martijn, "Aliweb—Archie–Like Indexing in the Web".
Railsback K, "Compass Server 3.0", ZDNET Reviews, Online, XP002126467, URL:http://www.zdnet.com/products/stories/reviews/0,4161,280094,00.htm, Feb. 13, 1998.
"Wise: A World Wide Web Resource Database System," Yuwono et al., IEEE Transactions on Knowledge and Data Engineering, Aug. 1996, vol. 8, No. 4, pp. 548–554, Aug. 1996.*
"A Regional Distributed WWW Search and Indexing Service—the Desire way," Anders ARdo et al., Computer Networks and ISDN Systems, vol. 30, No. 1–7, pp. 173–183, Apr., 1998.*
"A Distributed Digital Library Architecture Incorporating Different Index Styles," McNab et al., Proceedings of 1998 IEEE International Forum on Research and Technology Advances in Digital Libraries, pp. 36–45, Apr. 22–24, 1998, IEEE Catalog No.: 9.*

* cited by examiner

Primary Examiner—Hosain T. Alam
(74) Attorney, Agent, or Firm—Choate, Hall & Stewart; Monica Gerber; Sam Pasternack

(57) ABSTRACT

The system initiates a search at a first network site for user-specified data in a remote database at a second network site and conducts the search at a third network site (e.g., at a host computer's site). To begin, the system receives, at the first network site, a provider identifier associated with the database from the second network site. Thereafter, the user-specified data is input at the first network site, following which the user-specified data and the provider identifier are output from the first network site to the third network site. The system then searches for the user-specified data in a database at the third network site using the provider identifier. This database at the third network site includes data that corresponds to data stored in the remote database at the second network site.

24 Claims, 18 Drawing Sheets

FROM FIG.6A-1 http://www.mysite.com/index.html
or
http://www.internet.com/~mypage/index.html

WE ARE GOING TO SEND OUR WEB ROBOT TO VISIT ALL YOUR PAGES SO THAT WE CAN MAKE A SEARCH INDEX ON THEM. IF YOU HAVE PAGES THAT ARE NOT ACCESSABLE BY FOLLOWING LINKS FROM YOUR FIRST ENTRY POINT URL, PLEASE ENTER THAT ADDRESS AS WELL. FOR EXAMPLE, YOU MAY HAVE TWO DIFFERENT SETS OF PAGES ON YOUR SITE THAT ARE NOT LINKED TO EACH OTHER AT ALL. YOU SIMPLY NEED TO ENTER THE MAIN URL FOR EACH SITE. FOR EXAMPLE:

http://www.mysite.com/widgets/index.html
and
http://www.mysite.com/hammers/index.html

YOU MAY ENTER UP TO THREE (3) ENTRY POINTS TO YOUR SITE, IN THE FIELDS BELOW:

ENTRY POINT #1
ENTRY POINT #2
ENTRY POINT #3

*FROM FIG.6B-1*

● SERVER LEVEL RESTRICTION (DEFAULT)

YOUR SEARCH WILL BE LIMITED TO THE WEB SERVER THAT YOU SPECIFY IN YOUR FIRST ENTRY POINT. SO IF YOU SPECIFY: *http://www.mysite.com/somepage.html* THEN WE WILL LOOK FOR OTHER PAGES ON *www.mysite.com* BUT NOT ON OTHER SERVERS IN YOUR DOMAIN, LIKE *cgi.mysite.com*.

○ DOMAIN LEVEL RESTRICTION

YOUR SEACH WILL BE LIMITED ONLY TO YOUR DOMAIN. SO, IF YOU TYPE IN *http://www.mysite.com/somepage.html* AS YOUR FIRST ENTRY POINT, AND WE FIND A LINK TO A PAGE ON *http://server2.mysite.com* WE WILL FOLLOW THE LINK AND INDEX THOSE PAGES AS WELL.

PLEASE
REVIEW YOUR
SELECTIONS   [NEXT]
AND THEN
CLICK:

45

Choate, Hall & Stewart
www.choate.com

A Partnership Including Professional Corporations

About the Firm | News & Updates | Firm Directory | Recruiting | Announcements | Mail Exchange Place
53 State Street
Boston, Massachusetts 02109-2891
Telephone 617/248-5000
Fax 617/248-4000
E-Mail: info@choate.com Copyright 1996 by Choate, Hall & Stewart
Last Updated February 20, 1998

Parts of this Web Site may be considered advertising under the rules of the Massachusetts Supreme Judicial Court

FROM FIG.12B

LAST UPDATED: 7/3/98
...ELLECTUAL PROPERTY LABOR AND EMPLOYMENT CONSTRUCTION AND Z...
...GENCIES AND COURTS LABOR AND EMPLOYMENT MATTERS INCLUDING...
...SITIONS INSURANCE LABOR AND EMPLOYMENT PATIENT RIGHTS RE...
...UART CONSULTING ON LABOR AND EMPLOYMENT MATTERS AND DEVELOP
...
...PROPERTY LABOR AND EMPLOYMENT CONSTRUCTION AND ZONING LAN...
...D COURTS LABOR AND EMPLOYMENT MATTERS INCLUDING COLLECTIVE...
...NSURANCE LABOR AND EMPLOYMENT PATIENT RIGHTS REIMBURSEMEN...
...ULTING ON LABOR AND EMPLOYMENT MATTERS AND DEVELOPING AN EMP
...

88c

SEARCH AND INDEX HOSTING SYSTEM

BACKGROUND OF THE INVENTION

1. Field of the Invention

The present invention relates to a system for searching a remote database, and more particularly to a system which indexes documents in the database, which identifies documents in the index that include user-specified data, and which outputs a list of documents that contain such data and, optionally, excerpts from those documents. The invention has particular utility in connection with text indexing and retrieval systems, such as World Wide Web search engines.

2. Description of the Related Art

In general, search engines search through a database for specific data and retrieve titles of documents in the database which contain that data. For example, World Wide Web search engines, such as Altavista™ and Yahoo!®, provide users with the ability to search the Web for documents containing user-specified words, phrases, or the like. However, conventional search engines, and Web search engines in particular, suffer from a drawback in that they do not allow a user to direct a search to a single database.

More specifically, conventional Web search engines, such as those noted above, operate by generating an index for all sites on the Web, and then retrieving data from that index in response to user queries. Since these search engines generate an index for all sites on the Web, however, they are limited to searching the entire Web. This is disadvantageous, particularly for those users who only want to search specific sites.

In response to the foregoing drawbacks in the art, software manufacturers have developed site-specific searching systems, such as Ultraseek™, which ostensibly allow users to limit their searches to specific Web sites. To use these systems, however, they must be installed at each Web site, e.g., by the Web site's provider. Once installed, the systems create an index of the Web site at the provider's location. Thereafter, when a user accesses the Web site and inputs a search query, code at the site searches that index for the query, and relays the results of the search back to the user.

While the foregoing types of site-specific searching systems address some of the problems associated with conventional Web search engines, such as Yahoo!® and the like, they have several drawbacks. For example, their installation and subsequent maintenance can be costly and time consuming. As a result, Web site providers often choose not to install such systems at their sites. Additional problems arise with these systems in cases where a Web site is maintained by a Web site hosting company, as opposed to by the provider itself. That is, in these cases, in addition to the above problems, problems relating to licensing and the like arise, which make it difficult to implement conventional site-specific searching systems in a cost-effective manner.

In addition to the foregoing drawbacks, conventional database searching systems provide the user with only names/titles of documents in response to a query. For example, conventional Web search engines provide only the name of a document containing a search term, together with a uniform resource locator ("URL") for that document. As a result, it is not always possible for the user to determine which of the retrieved documents is relevant without actually linking to, and opening, the document. This can slow down searching significantly.

Thus, there exists a need for a searching system which provides the user with the ability to search a portion of a database, such as one or more sites on the World Wide Web, and which is more cost effective, efficient, and easy to use than the conventional systems described above. In addition, there exists a need for a database searching system which is able to provide a user with the context of each search term in documents retrieved as a result of the search.

SUMMARY OF THE INVENTION

The present invention addresses the foregoing needs by providing a way to search through a database at one network site (e.g., a Web site) using a host computer which is at another network site. By hosting the search at a separate site, the present invention facilitates site-specific searching, as described below.

More specifically, according to the present invention, a Web site provider, for example, is able to create a search engine for the Web site simply by accessing the present invention via the Web and entering a request for a new account. In response to this request, the invention assigns the Web site a provider identifier, and then extracts URL(s) from the Web site. Thereafter, the invention "crawls" through the site in order to create an index of the site, which comprises data from the site indexed by document (e.g., Web page) and provider identifier. Once the indexing process has been completed, the site provider need simply copy a few (e.g., 10) lines of code into any sites for which searching capabilities are desired.

Following the foregoing (i.e., the setup), each time the Web site is visited, it will automatically transmit its provider identifier to the visiting user's site. In addition, the Web site will display a search line, from which the visiting user may enter queries to search the site for specific data. When such a query is entered, the query, together with the provider identifier, is passed from the user's site to the host computer's site, where the actual searching takes place. Specifically, at the host computer's site, an index corresponding to the provider identifier is retrieved from memory and searched for the data specified in the user's query. Thereafter, a list of documents which contain the data (including URLs in the case of the Web) is output from the host computer's site to the user's site and displayed there.

By conducting the search at the host computer's site, rather than at the Web site itself, the present invention reduces the difficulties involved with installing and maintaining an entire software application at the Web site. As a result, the present invention provides a way to search specified Web sites (and other types of databases as well), which is more efficient and less costly and time consuming than the conventional site-specific searching systems described above.

Thus according to one aspect, the present invention is a system (i.e., a method, an apparatus, and computer-executable process steps) for initiating a search at a first network site for user-specified data in a remote database at a second network site and for conducting the search at a third network site (e.g., at a host computer's site). To begin, the system receives, at the first network site, a provider identifier associated with the database from the second network site. Thereafter, the user-specified data is input at the first network site, following which the user-specified data and the provider identifier are output from the first network site to the third network site. The system then searches for the user-specified data in a database at the third network site using the provider identifier. In the invention, this database at the third network site includes data that corresponds to data stored in the remote database at the second network site.

According to another aspect, the present invention is a way to configure a computerized searching system (such as the searching system resident at the host computer's site described above) so that the searching system can be used to search a database. In this aspect of the invention, information identifying the database is input, a provider identifier is assigned to the database, and a search through the database is conducted using the input information in order to identify locations of documents in the database. Thereafter, the locations of the documents in the database are stored in memory together with the provider identifier, and the documents in the database are indexed. An index of the documents is then stored in memory together with the provider identifier; and data corresponding to data in the database is also stored in memory together with the provider identifier. The provider identifier is then output to the database. As noted above, this provider identifier is transmitted to those who visit the site.

According to still another aspect, the present invention is a system for identifying which documents in a database contain user-specified data. The system stores, in memory, indices of data in plural databases, such as those noted above. The system then receives the user-specified data and a provider identifier which corresponds to one of the plural databases, and retrieves, from memory, an index of data for a database that corresponds to the provider identified. Thereafter documents in the retrieved index that contain the user-specified data are identified, and identities thereof are output to the user.

The present invention also provides an optional feature for displaying excerpts from documents identified by a database search. In this aspect of the invention, the index of documents in the database is stored, and pointers to data segments in the database are generated based on the index. These data segments comprise target data together with data surrounding the target data. That is, assuming that the target data comprises a word which matches an input user query, the data segment for that word might comprise, e.g., five words to the left of the word, the word itself, and five words to the right of the word. When the invention searches the index for the word, it compiles a list of pointers to data segments which include the word. These data segments may then be extracted and passed to a user's site for display along with the list of documents.

Thus, according to this aspect, the invention is a system for retrieving a list of documents in a database which include user-specified data, and of retrieving one or more data segments from each document on the list. The system includes storing an index of documents from the database, the index including pointers corresponding to data in the database, where the pointers define data segments having a predetermined size. One or more documents in the database that contain the user-specified data are then identified based on the index; and a list is created which includes one or more pointers corresponding to each occurrence of the user-specified data in the identified documents. Each data segment in the database that contains the user-specified data is extracted based on the list of pointers created in the creating step, whereafter a list of the documents in the database that contain the user-specified data is output, together with the extracted data segments.

By virtue of the foregoing, the invention makes it possible to display data excerpts (i.e., segments) from each document found in the search. A user may then refer to these excerpts in order to determine whether each document is relevant, instead of actually opening the document. As a result, the present invention facilitates database searching.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 7 shows an example of a Web site which does not include the search hosting system of the present invention.

DETAILED DESCRIPTION OF THE PREFERRED EMBODIMENT

Figure 1:
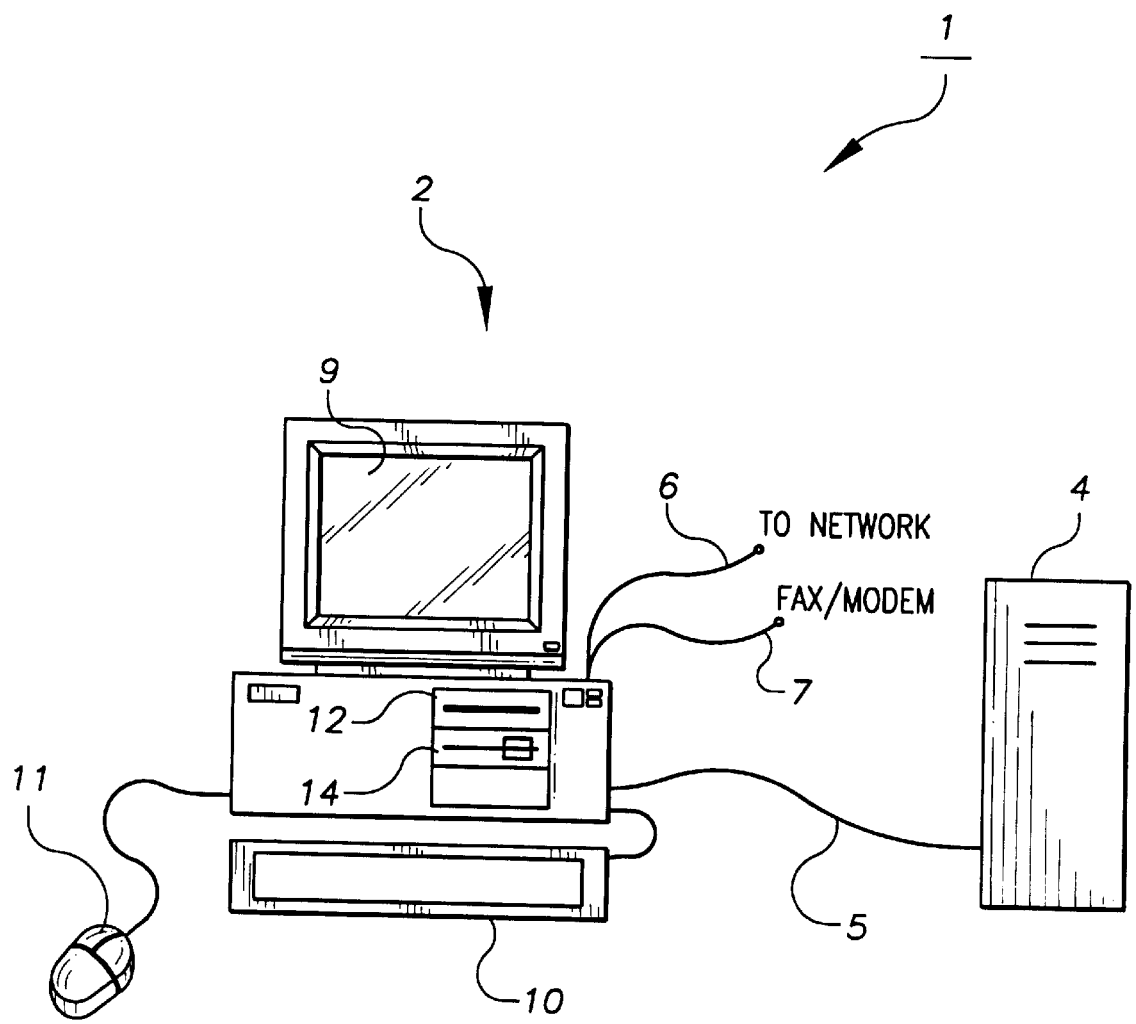
FIG. 1 is a perspective view of a host computer system, including a personal computer and a query server, which is used in the present invention.

FIG. 1 shows a representative embodiment of a host computer system which can be used to implement the present invention. As shown in FIG. 1, host computer system 1 includes PC 2 and query server 4. PC 2 includes a local area network connection 5 for interfacing to query server 4, a general network connection 6 for interfacing to a network such as the Internet, and fax/modem connection 7 for interfacing with other remote sources. PC 2 also includes display screen 9 for displaying information, keyboard 10 for inputting text and user commands, mouse 11 for positioning a cursor on display screen 9 and for inputting user commands, disk drive 12 for reading from and writing to floppy disks installed therein, and CD-ROM drive 14 for accessing information stored on CD-ROM. PC 2 may also have one or more peripheral devices (not shown) attached thereto.

Figure 2:
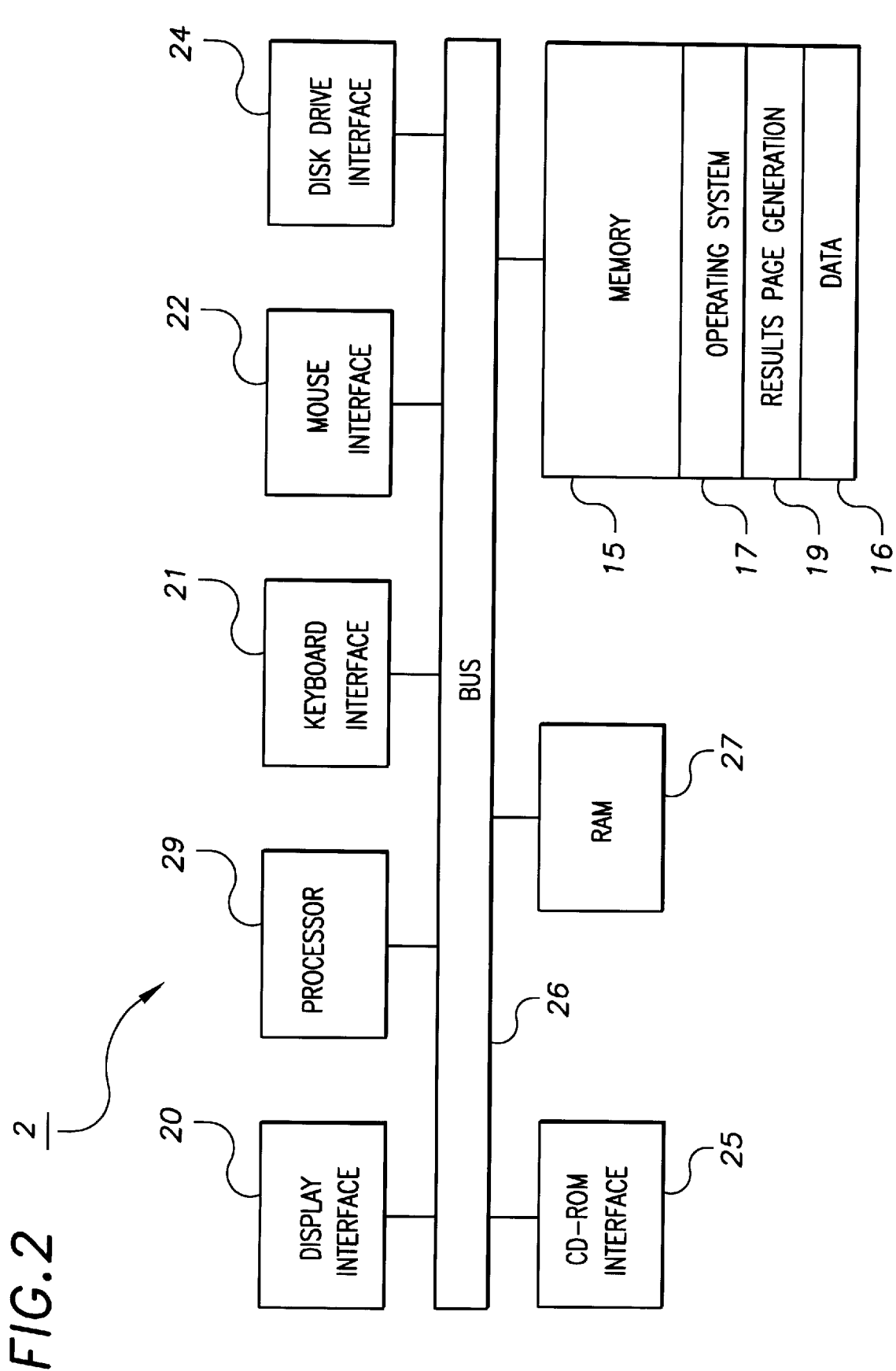
FIG. 2 shows the architecture of the personal computer shown in FIG. 1.

FIG. 2 shows the internal structure of PC 2. As shown in FIG. 2, PC 2 includes memory 15, which comprises one or more computer-readable media, such as a computer hard disk. Memory 15 stores data 16, applications, and an operating system 17. Among the applications stored in memory 15 is results page generator 19, the function of which is described in detail below. Also included in PC 2 are display interface 20, keyboard interface 21, mouse interface 22, disk drive interface 24, CD-ROM drive interface 25, computer bus 26, RAM 27, and processor 29. Processor 29 preferably comprises a microprocessor or the like for executing applications out of RAM 27. As noted above, these applications may be stored in memory 15 or, alternatively, on a floppy disk in disk drive 12 or a CD-ROM in CD-ROM drive 14. In this regard, processor 29 accesses applications (or other data) stored on a floppy disk via disk drive interface 24 and accesses applications (or other data) stored on a CD-ROM via CD-ROM drive interface 25.

Application execution and other tasks of PC 2 and query server 4 may be controlled and/or altered using keyboard 10 or mouse 11, commands from which are transmitted to processor 29 via keyboard interface 21 and mouse interface 22, respectively. Output results from some applications running on PC 2 may be processed by display interface 20 and then displayed to a user on display 9. To this end, display interface 20 preferably comprises a display processor for forming images based on data provided by processor 29 over computer bus 26, and for outputting those images to display 9. Other applications, such as results page generator 19 receive their inputs from, and/or provide outputs to, network interfaces 5 and 6.

Figure 3:
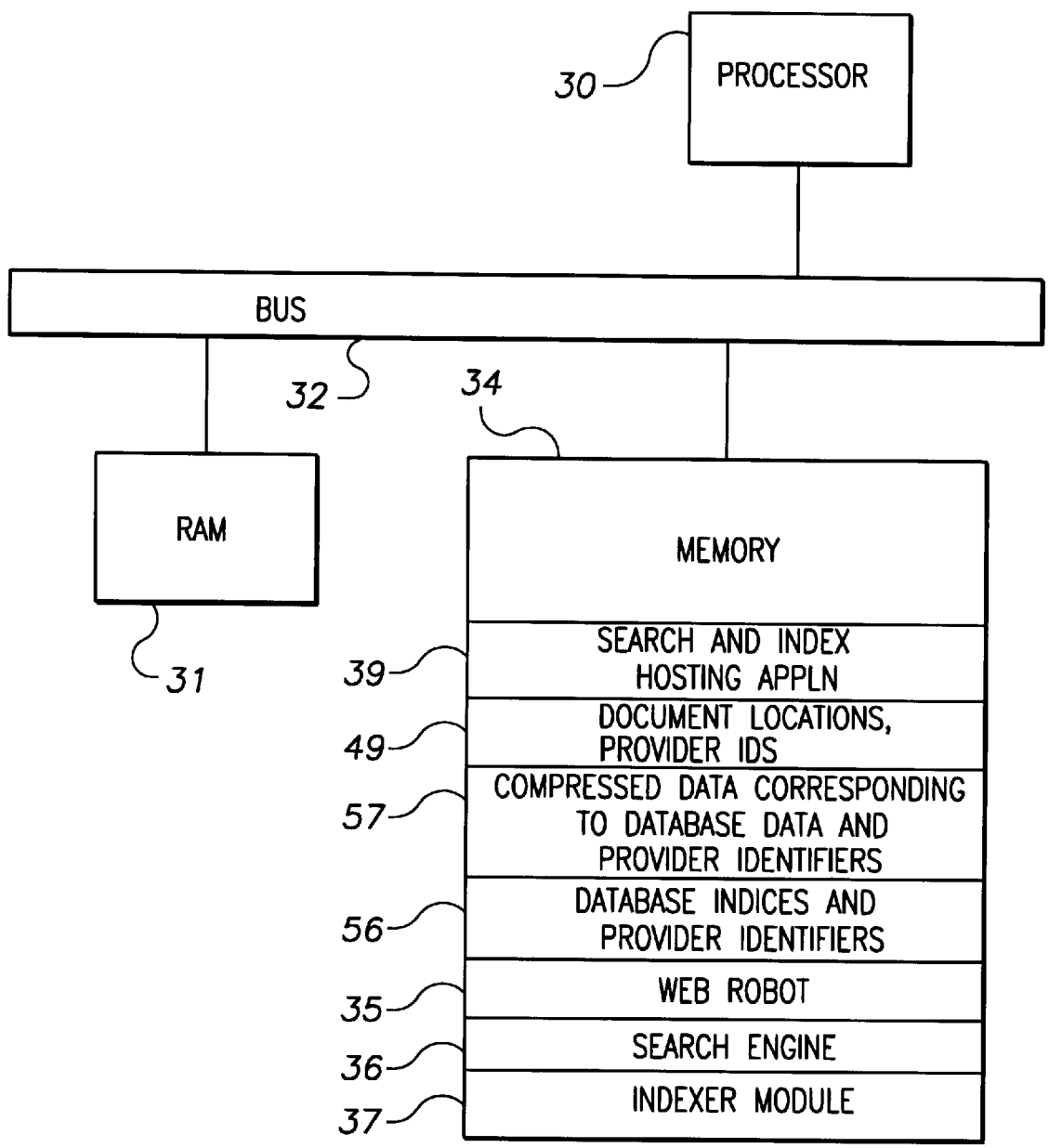
FIG. 3 shows the architecture of the query server shown in FIG. 1.

FIG. 3 shows a representative architecture for query server 4. As shown in FIG. 3, query server 4 includes processor 30, RAM 31, computer bus 32, and memory 34. Memory 34 preferably comprises one or more computer-readable media, such as a computer hard disk. Memory 34 data and applications, with the applications including Web robot 35, Web search engine 36, indexer module 37, and search and index hosting application 39, among others. Search and index hosting application 39 comprises computer-executable process steps to generate and execute a database-specific search engine A detailed description of these process steps is provided below.

In preferred embodiments of the invention, search engine 36 and indexer module 37 are based upon the search engine and indexer described in "The SMART Retrieval System: Experiments in Automatic Document Processing" by Gerald Salton (Prentice-Hall, Inc. (1971)) and "A Theory of Indexing" also by Gerald Salton (J. W. Arrowsmith, Ltd. (1975)). The contents of these two documents are hereby incorporated by reference into the subject application as if set forth herein in full. Web robot 35 can comprise any commercially available Web robot.

Applications such as search and index hosting application 39 are executed by processor 30 out of RAM 31, and results therefrom are output to host computer 2 via network connection 5. In this regard, search and index hosting application 39 comprises a database-specific search engine, in that it identifies which documents in a database contain a user-specified query term. The application then retrieves a list of such documents and, optionally, one or more data segments from each document on the list. In the preferred embodiment of the present invention, the database searched by application 39 is a Web site and the documents comprise one or more Web pages. However, it is noted that the invention is not limited to searching Web sites and, in fact, can be used to search a variety of different types of databases. Moreover, it is noted that although the invention will be described with respect to retrieving documents from Web sites based on text/character strings, the invention is not limited to this either. That is, the invention may also be used to retrieve images or other figures from any type of database.

Figure 4:
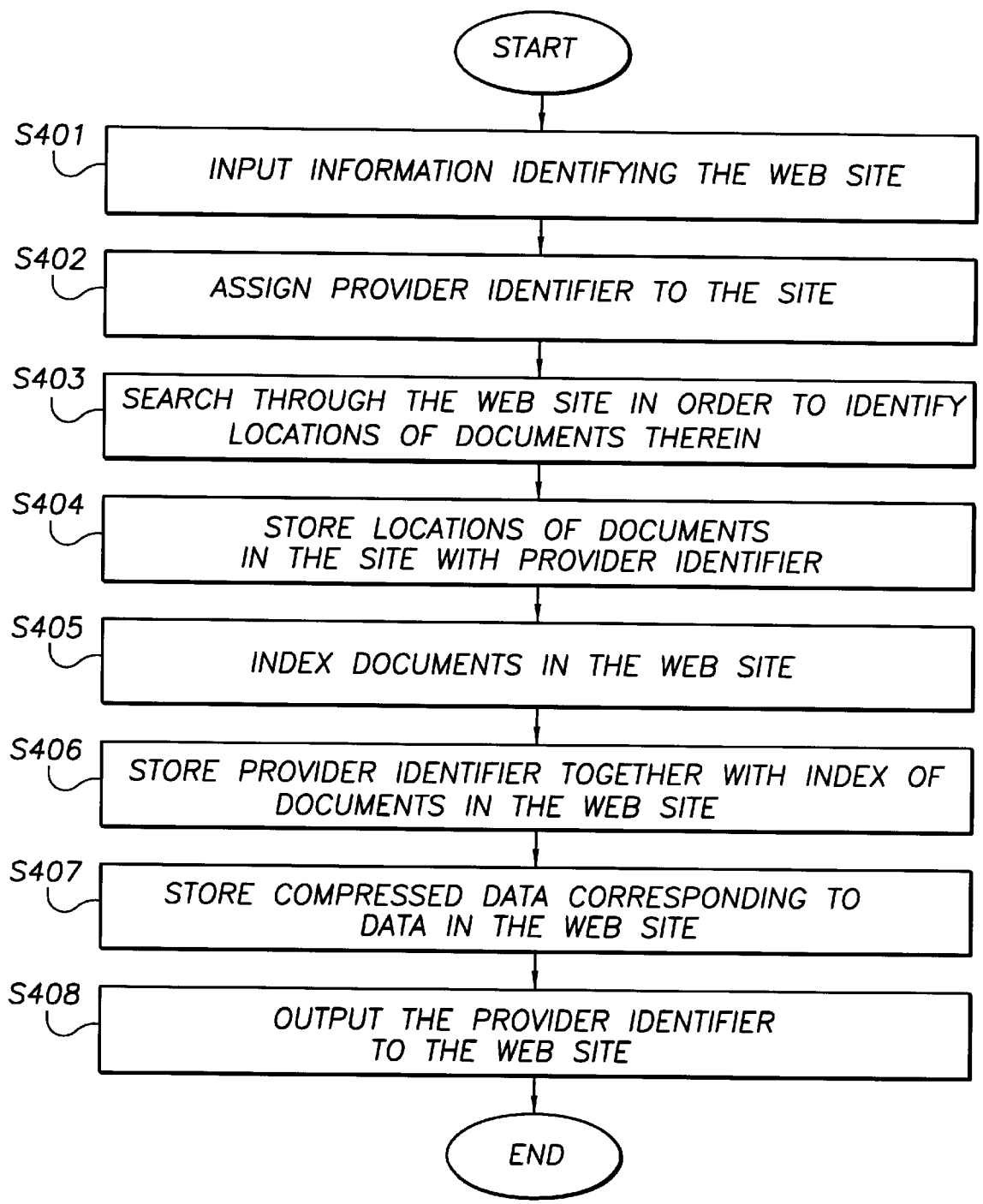
FIG. 4 is a flow diagram showing process steps for setting-up the search hosting system of the present invention on a Web site.
Figure 5:
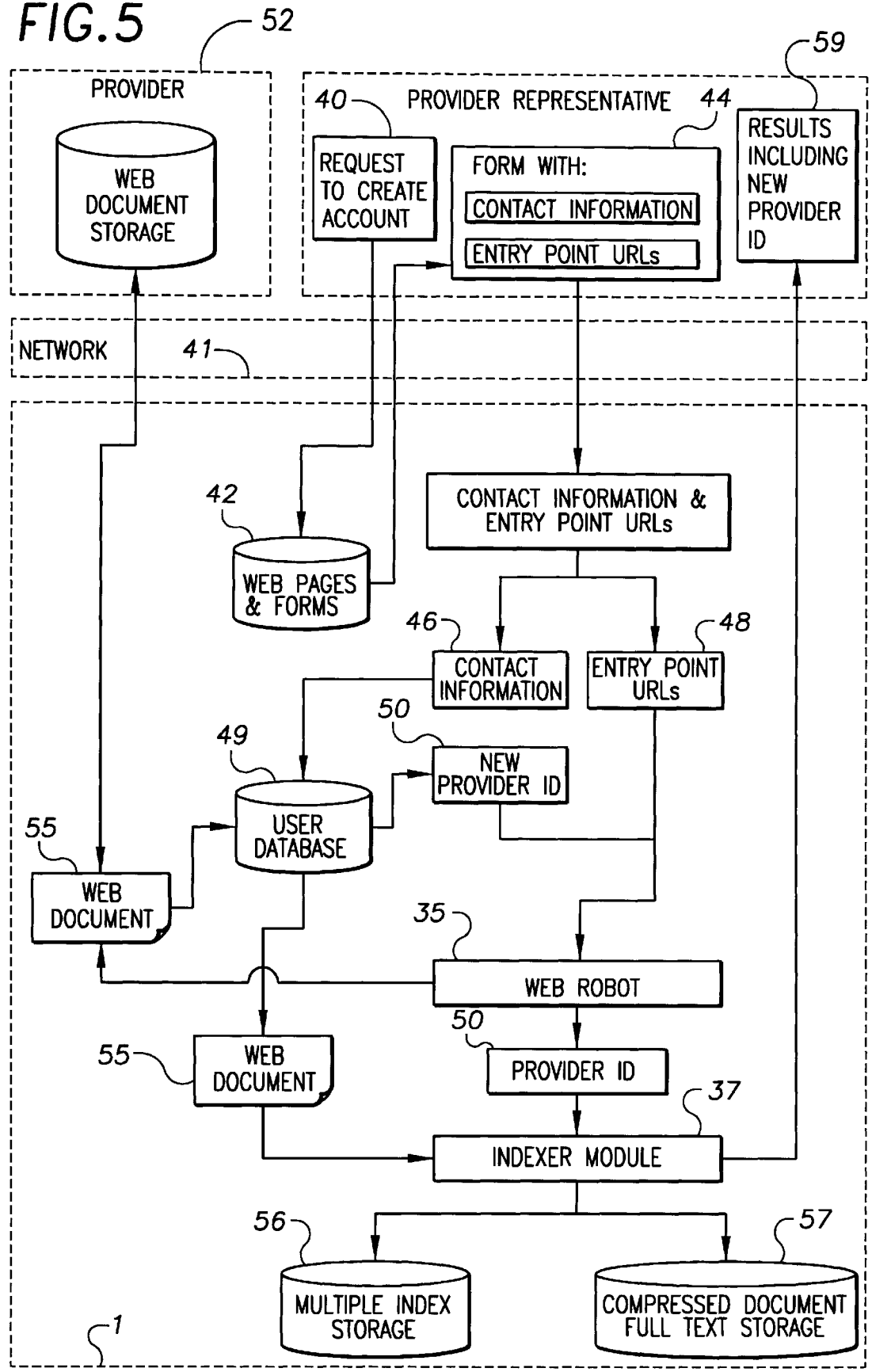
FIG. 5 shows the software architecture used to implement the process steps shown in FIG. 4.

Prior to performing site-specific searching using the present invention, it is necessary for a Web site provider to set up an account. FIGS. 4 and 5 show how this is done.

More specifically, as shown in FIG. 5, a Web site provider's representative, such as their system administrator, issues request 40, over network 41 (e.g., the Internet), to a host computer system running search and index hosting application 39. In response, search and index hosting application 39 retrieves Web page forms required to set up a new account from storage 42, and transmits these forms back to the provider's representative, where the forms are displayed on the representative's computer. As shown in FIG. 5, displayed form 44 requests "contact" information (e.g., information regarding the provider's Web site) and entry point URLs for the site. This contact information may be input in step S401 of FIG. 4.

Figures 1, 6A:
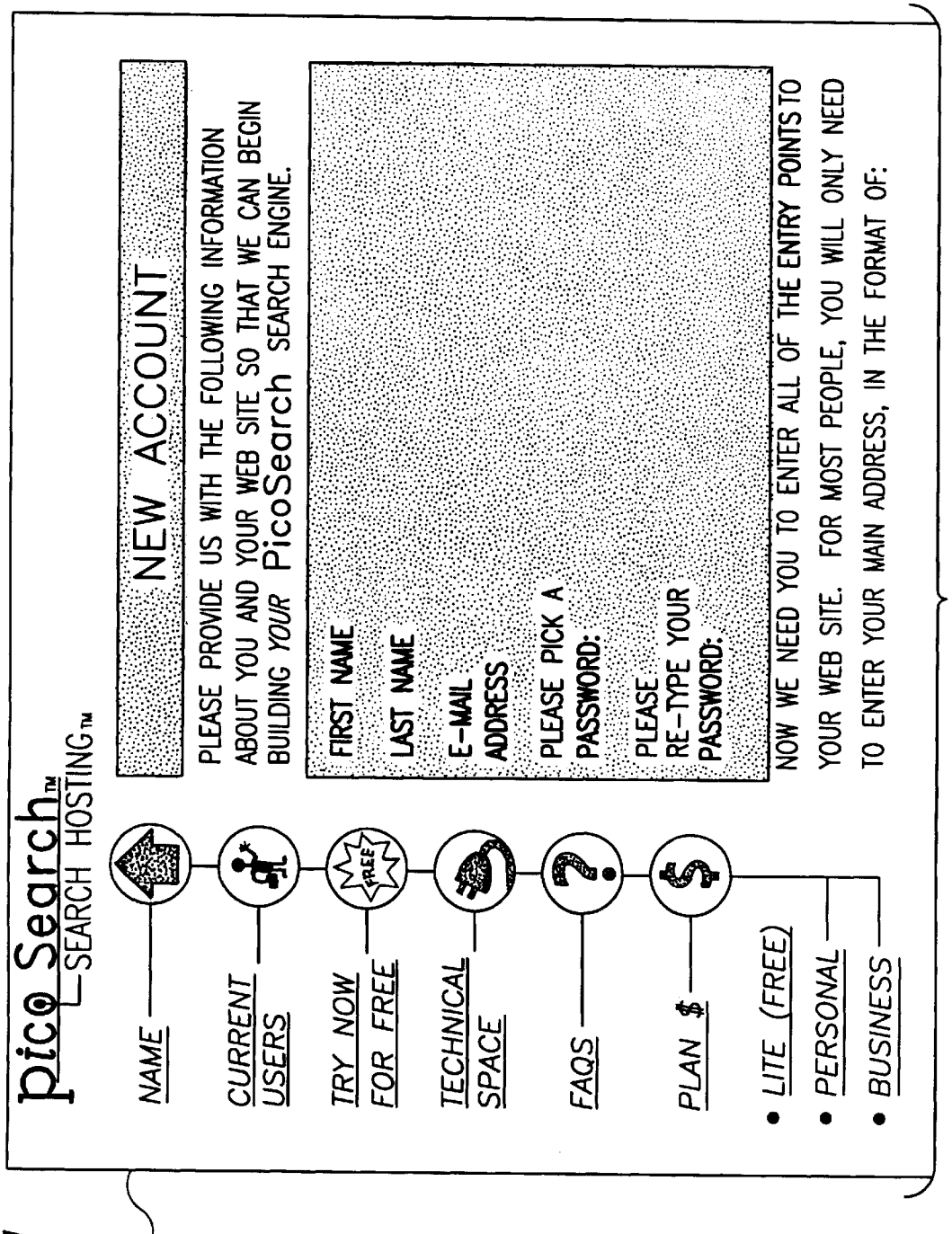
FIGS. 6A and 6B show a representative new account form used in setting-up the search hosting system of the present invention.
Figures 1, 6B:
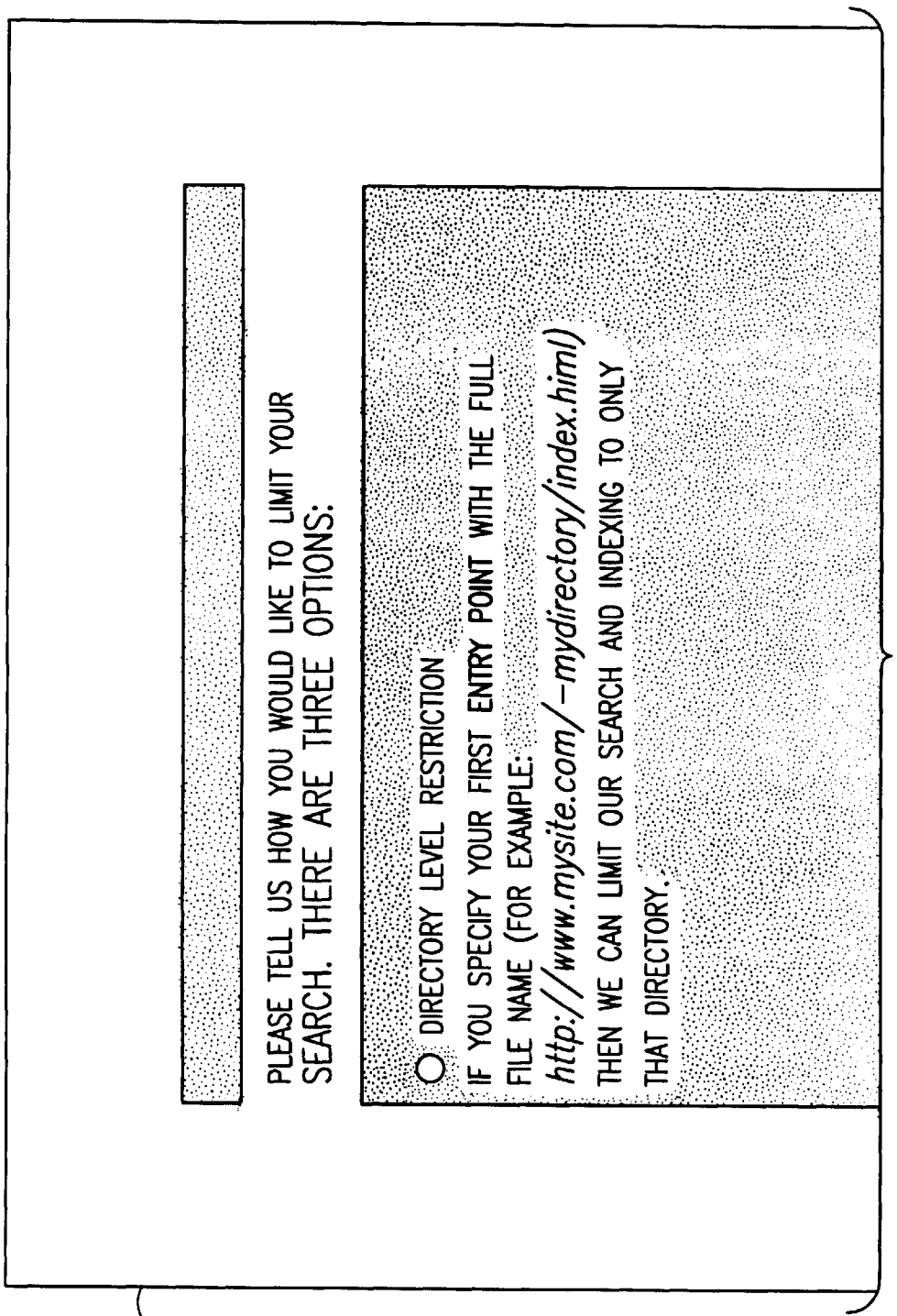

FIGS. 6A and 6B show a representative example of a new account form generated by a preferred embodiment of the present invention, which will be sold under the tradename PicoSearch™. As shown in these figures, new account form 45 requests information regarding the provider's representative, such as their name, E-mail address, and account password, together with three entry point URL's to the provider's Web site. Of course, the invention is not limited to using three entry point URLs, and even can be used without entering the contact information shown in FIG. 6A. As shown in FIG. 6B, the preferred embodiment of the invention also provides a way in which to control searching throughout a specified site. For example, in this embodiment, it is possible to restrict searching to the directory level, the server level, or the domain level. Of course, the invention is not limited to the restrictions shown in FIG. 6B, and can be modified to include other searching options as well.

Once the contact information and entry point URLs have been added to the new account form, the "filled-out" form is transmitted over the network to the host computer system. There, contact information 46 and entry point URLs 48 are extracted from the new account form, as shown in FIG. 5. The contact information (i.e., the provider representative's name, E-mail address, etc.) is then stored in user database 49, which may reside on memory 34 or any other memory on the host computer system. Search and index hosting application 39 then assigns the provider representative a new provider identifier 50 in step S402. This provider identifier is then combined with entry point URLs 48, the combination of which is provided to Web robot 35.

At about the same time or shortly thereafter, Web site provider 52 provides data from its Web site (e.g., plural Web documents/pages) to host computer system 1 via network 41. In step S403, Web robot 35 searches through the data from the Web site for locations (i.e., URLs) and titles of documents therein, starting at the entry point URLs specified in the new account form. Next, in step S404, the location and title of each Web document that is found in the search is stored in user database 49, together with the provider identifier and a predetermined document identifier for each document. The use of these document identifiers is described below. After Web robot 35 has completed its "crawl" of the Web site, Web robot 35 passes provider identifier 50 for the Web site to indexer module 37.

In step S405, indexer module 37 indexes data stored in documents on the Web site. More specifically, indexer module 37 reviews each of Web documents 55 identified by Web robot 35, and creates an index of pointers to data in the Web site, where the data is indexed according to document, location in the document, and provider identifier. This index, together with the provider identifier and predetermined document identifiers, is then stored in multiple index storage 56 in step S406. In preferred embodiments of the invention, multiple index storage 56 resides in memory 34 of query server 4; although the invention is not limited to storing multiple index storage 56 there.

In addition to indexing data in the manner described above, in step S407, indexer module 37 compresses data from the Web site and stores that data in compressed document full text storage 57, together with the provider identifier for the site. As was the case above, storage 57 can reside in memory 34; although the invention is not limited to this. Next, in step S408, indexer 37 outputs processing results 59, including the provider identifier, to the provider's representative, as shown in FIG. 5. At this point, it is noted that although FIG. 5 shows the provider's representative at a location which is different from that of the Web site provider, this need not be the case. That is, the provider's representative and the provider may also be at the same location.

Figure 8:
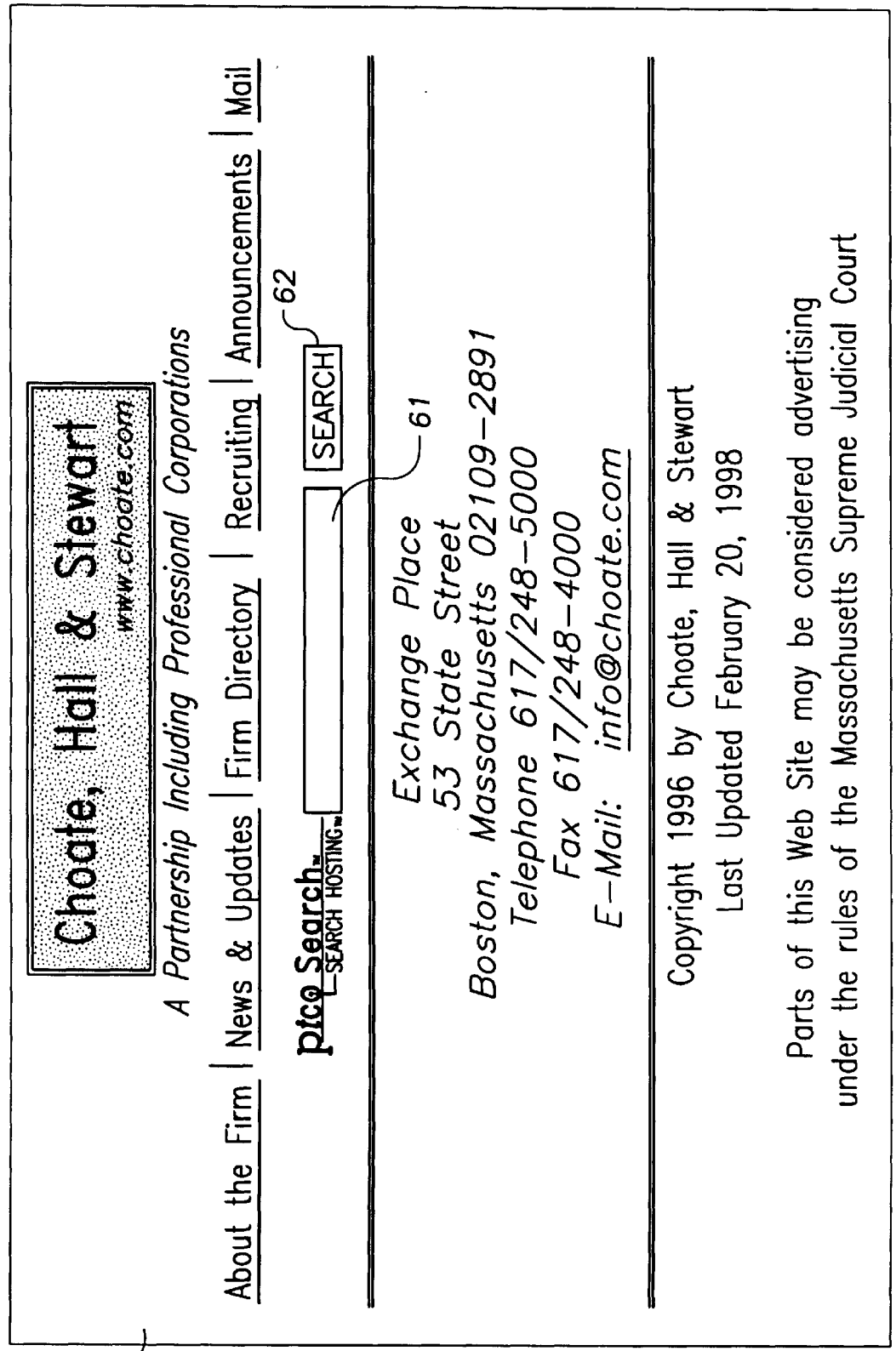
FIG. 8 shows an example of a Web site which includes the search hosting system of the present invention.

Once an account has been established for the Web site, the provider's representative should copy code provided by the host computer system into their Web site. A representative example of such code is shown in the Appendix attached hereto. Among other things, this code permits the Web site to provide an interface to search and index hosting application 39 on the host computer system. As an illustration, FIG. 7 shows an example of a Web site 60 which does not include the site-specific searching capabilities of the present invention, while FIG. 8 shows that same Web site with the site-specific searching capabilities. As shown in FIG. 8, the site with the searching capabilities includes entry line 61 and search button 62. To search for a text or the like at Web site 60, all that must be done is to input the text on the entry line, and click on the search button The searching process of the present invention is described below with respect to the remaining figures.

First, however, it is noted that although the invention has been described with respect to only one Web site provider, the invention is not limited to use with only one provider. In fact, the invention is able to handle searches of any number of Web sites. That is, any number of Web site providers' representatives may set up accounts with the host computer system. As a result, the host computer system may store indices of data from plural databases (e.g., plural Web sites), locations of documents in those plural databases, and compressed text from the plural databases. However, because the invention also stores with each of these a provider identifier, the invention is able to select the appropriate data readily, and thus to perform site-specific searches. This feature of the invention is described more fully below.

Figure 9:
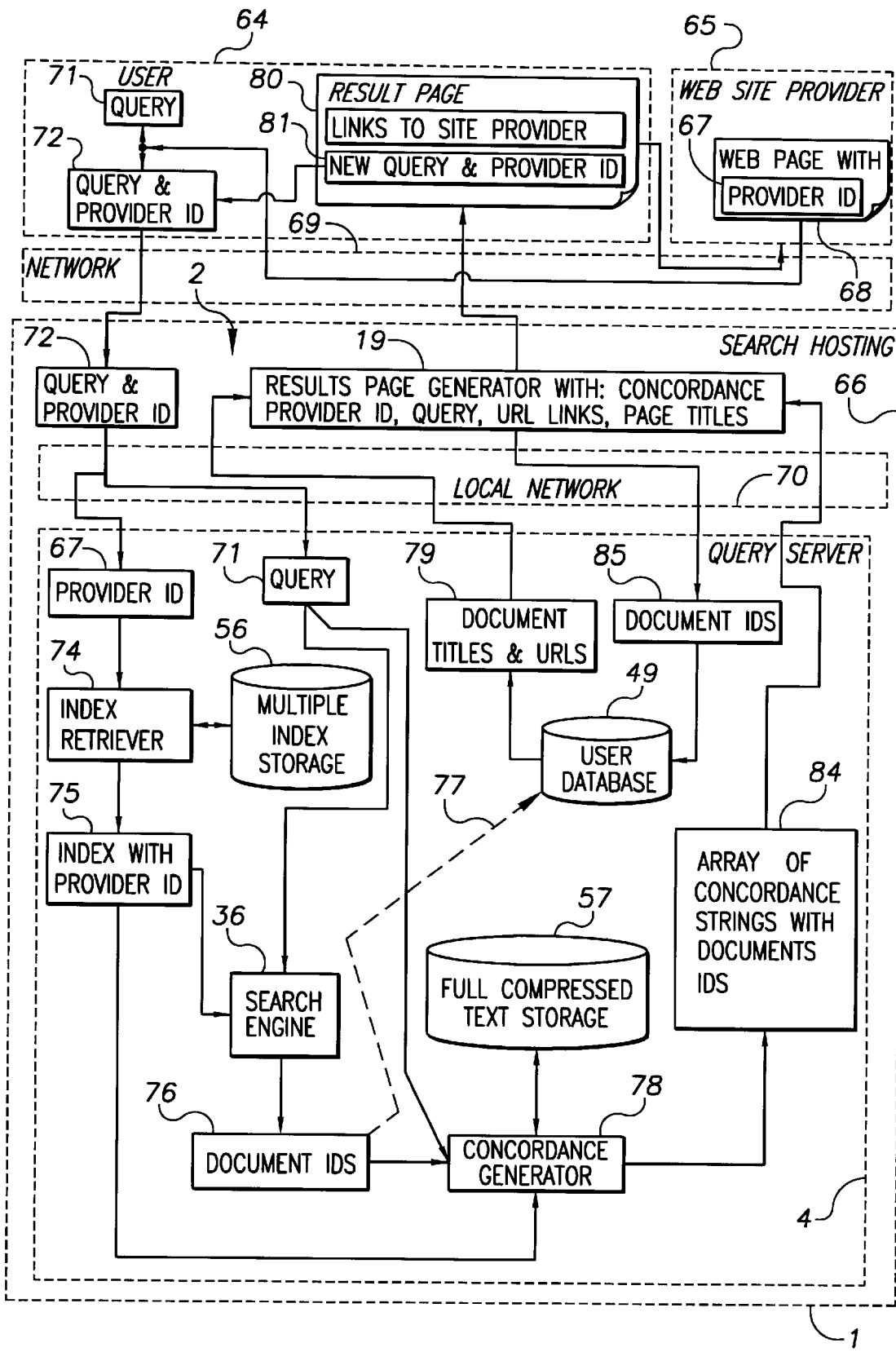
FIG. 9 shows the software architecture of the search hosting system of the present invention.

In brief, as shown FIG. 9, a user initiates a search at first network site 64 (e.g., the user's computer) for data in a remote database at second network site 65 (e.g., an Internet site or Web site server) and the invention conducts the search at third network site 66 (e.g., the host computer system). At this point, it is noted that although FIG. 9 shows the three network sites 64, 65 and 66 at three different locations (i.e., at three computer systems) on the network, these network sites may reside at the same network location or, alternatively, at only two different network locations. In any event, in accordance with the invention, first network site 64 receives a provider identifier associated with the database from second network site 65 and then outputs a query containing user-specified data and the provider identifier from first network site 64 to third network site 66. Third network site 66 then searches for the user-specified data in a database at the third network site using the provider identifier. This database at third network site 66 includes data that corresponds to data stored in the remote database at the second network site. The above process is described in more detail below.

Figure 10A:
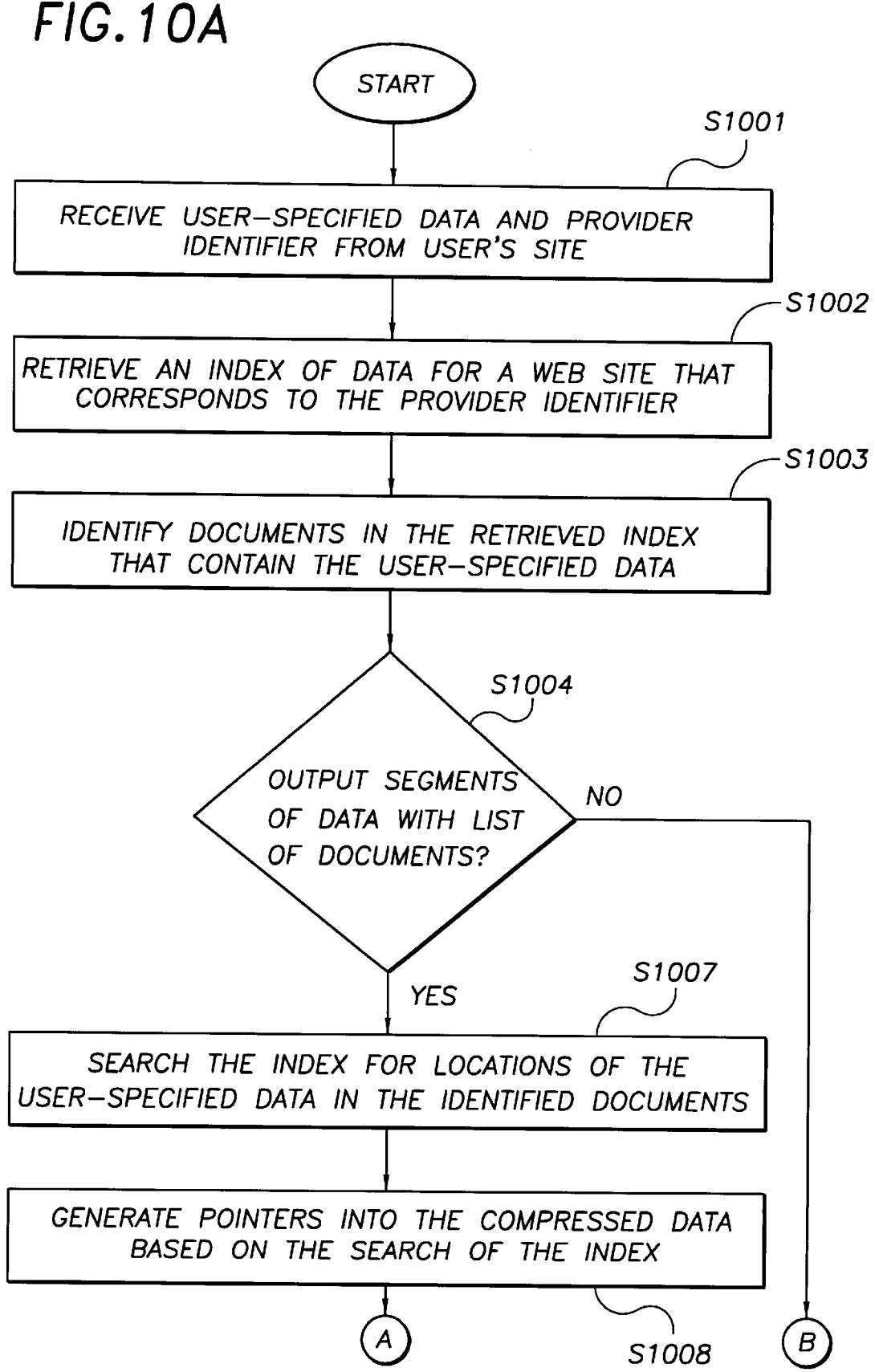
FIGS. 10A and 10B show process steps implemented by the software architecture of FIG. 9 to perform a search of a Web site at a host computer system.

More specifically, as shown in FIG. 9, a user at first network site 64 initiates contact to Web site 65 via a Web browser (not shown), such as Netscape®. In response, Web site 65 automatically provides the user's computer with its provider identifier 67, together with Web page(s) 68 from the site. An example of such a page is shown in FIG. 8. Thereafter, the user may enter a query 71 comprised, e.g., of user-specified data such as character strings, text, or the like, into the entry line provided with the Web page. The query and the provider identifier are then packetized and packet 72 is passed, via network 69 (e.g., the Internet), to the host computer (i.e., PC 2). The host computer receives this packet in step S1001 of FIG. 10A, extracts the provider identifier and data from the query, and passes this information on to query server 4 via local network 70 (i.e., over local network connection 5 shown in FIG. 1).

Thereafter, in step S1002, index retriever 74 uses provider identifier 67 to retrieve, from multiple index storage 56, an index of data that has the same provider identifier as the Web site. This index with the same provider identifier, labeled 75 in FIG. 9, is then passed to search engine 36, along with query 71. In step S1003, search engine 36 searches through index 75 for data specified in query 71 in order to identify documents that contain the specified data. The search engine then retrieves identifiers 76 (e.g., numbers) for these documents from the index. Thereafter, processing proceeds to step S1004.

Figure 10B:
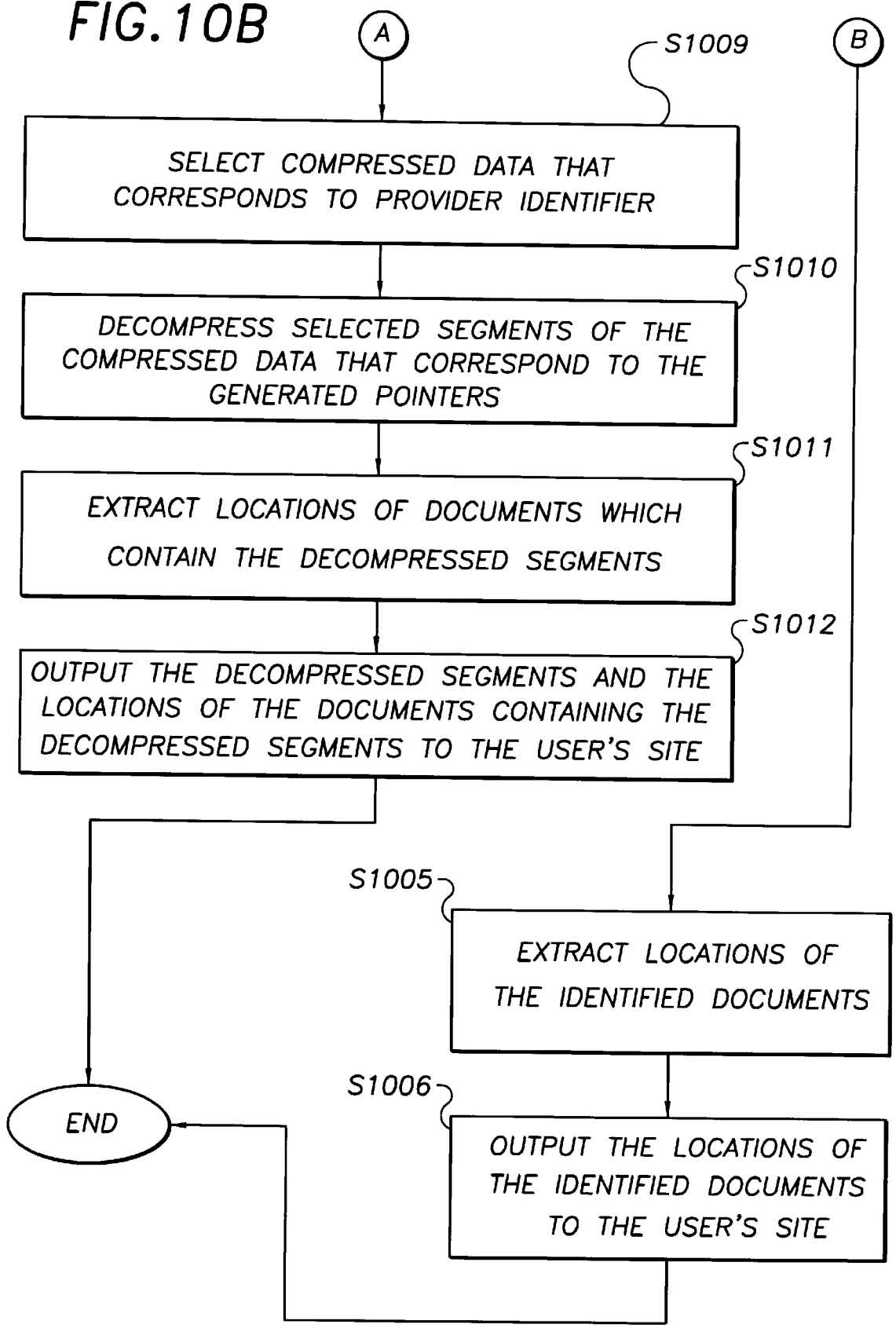

Step S1004 determines whether data segments in each identified document should be output along with a list of identified documents. In a case that step S1004 determines that no data segments should be output, processing proceeds to step S1005 of FIG. 10B. As shown in FIG. 9, this processing corresponds to dashed line 77, which bypasses concordance generator 78 (described below). Thus, in step S1005, search and index hosting application 39 extracts locations (e.g., URLs) and titles of documents from user database 49 that have identifiers which match the documents identified in step S1003.

The extracted document locations and titles 79 are then output, via local network 70, to results page generator 19. In step S1006, results page generator 19 generates a results page showing titles of, and URL links to, documents on the Web site which contain the data specified in the query. This results page 80 is then passed to the user's computer via network 69, where it is displayed. In preferred embodiments of the invention, this results page also includes an entry line, such as entry line 81 shown in FIG. 9, from which the user may initiate a new search of the Web site. If no new searches are to be performed, processing ends. Otherwise, the foregoing process is repeated for the new search.

Returning to FIG. 10A, in a case that data segments, such as text excerpts or the like, are to be output along with the list of documents, processing proceeds to step S1007. In this regard, as noted above, the present invention includes the capability of also outputting, from each document on the list, a text or data segment which contains the user-specified data. These segments comprise target data (i.e., the user-specified data) together with data adjacent to the target data. That is, assuming that the target data comprises a word which matches the user-specified data, the data segment for that word might comprise, e.g., five words to the left of the word, the word itself, and five words to the right of the word. Of course, the invention is not limited to using eleven-word data segments, meaning that any size data segment may be used. In fact, in preferred embodiments, the size and/or locations of the data segments relative to the user-specified data are settable by the user, and thus can be varied as desired.

Figure 11:
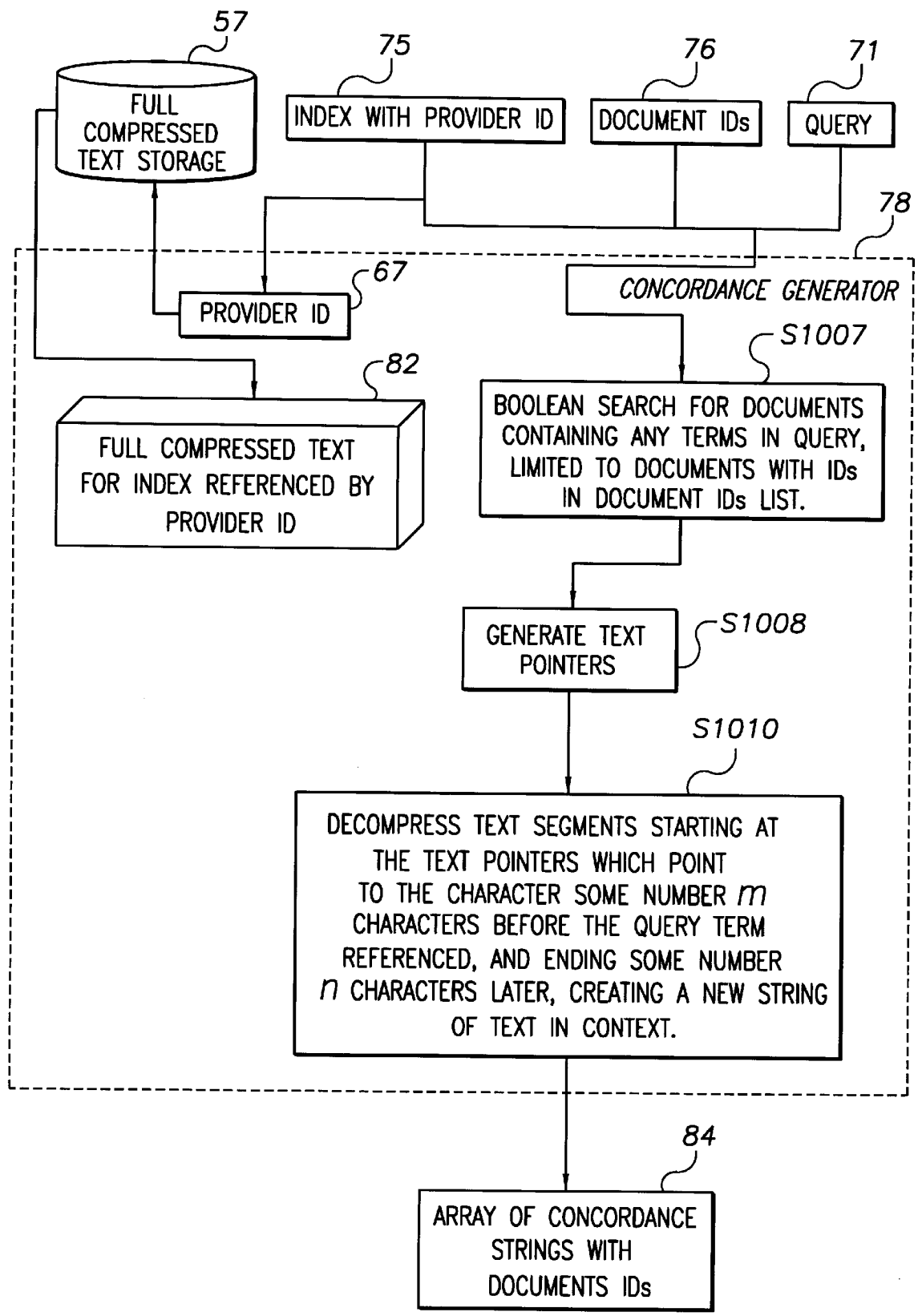
FIG. 11 shows operation of a concordance generator included in the software architecture of FIG. 9.

Thus, following step S1004, in step S1007 concordance generator 78 searches the documents identified in step S1003 for locations of the user-specified data. FIG. 11 is a close-up view of the operation of concordance generator 78. More specifically, as shown in FIG. 11, in step S1007 concordance generator 78 performs a boolean search through documents 76 for data that matches data specified in query 71. When matching data is found, step S1008 generates pointers into the corresponding compressed data based on pointers to locations in the index. The generated pointers identify the user-specified data in the compressed data, together with a predetermined amount of additional adjacent data needed to make up a data segment.

Roughly concurrently, in step S1009, concordance generator 78 extracts the provider identifier for the current Web site from index 75, and selects and retrieves compressed data 82 for that Web site from fall compressed text storage 57. Thereafter, in step S1010, concordance generator 78 decompresses selected data segments that correspond to the pointers generated in step S1008. In preferred embodiments of the invention, only compressed data corresponding to the selected data segments is decompressed. As noted in FIG. 11, a data segment may start m characters before the query term and end n characters after the query term-only this segment would be decompressed. Thereafter, arrays 84 of concordance strings (i.e., decompressed data segments) are output from concordance generator 78, together with corresponding document identifiers specifying the document from which each string originated.

Arrays 84 of concordance strings are then output from query server 4 to results page generator 19 via local network 70. Results page generator 19 uses the decompressed data segments to formulate its results page. In addition, results page generator 19 extracts document identifiers 85 corresponding to the decompressed data segments, and passes these document identifiers back to query server 4. In step S1011, query server 4 extracts locations (e.g., URLs) and titles of documents from user database 49 that match the document identifiers, and passes this information back to results page generator 19. Results page generator 19 formulates a results page which includes document titles, data segments, URLS, and the original query term, and passes the results page, together with the provider identifier, back to the user in step S1012. The results page is then displayed on the user's computer. As was the case above, the results page may include an entry line, from which the user may conduct another search of the Web site specified by the provider identifier. If no additional search is to be conducted, processing ends. Otherwise, the foregoing process is repeated for the new search.

Figure 12A:
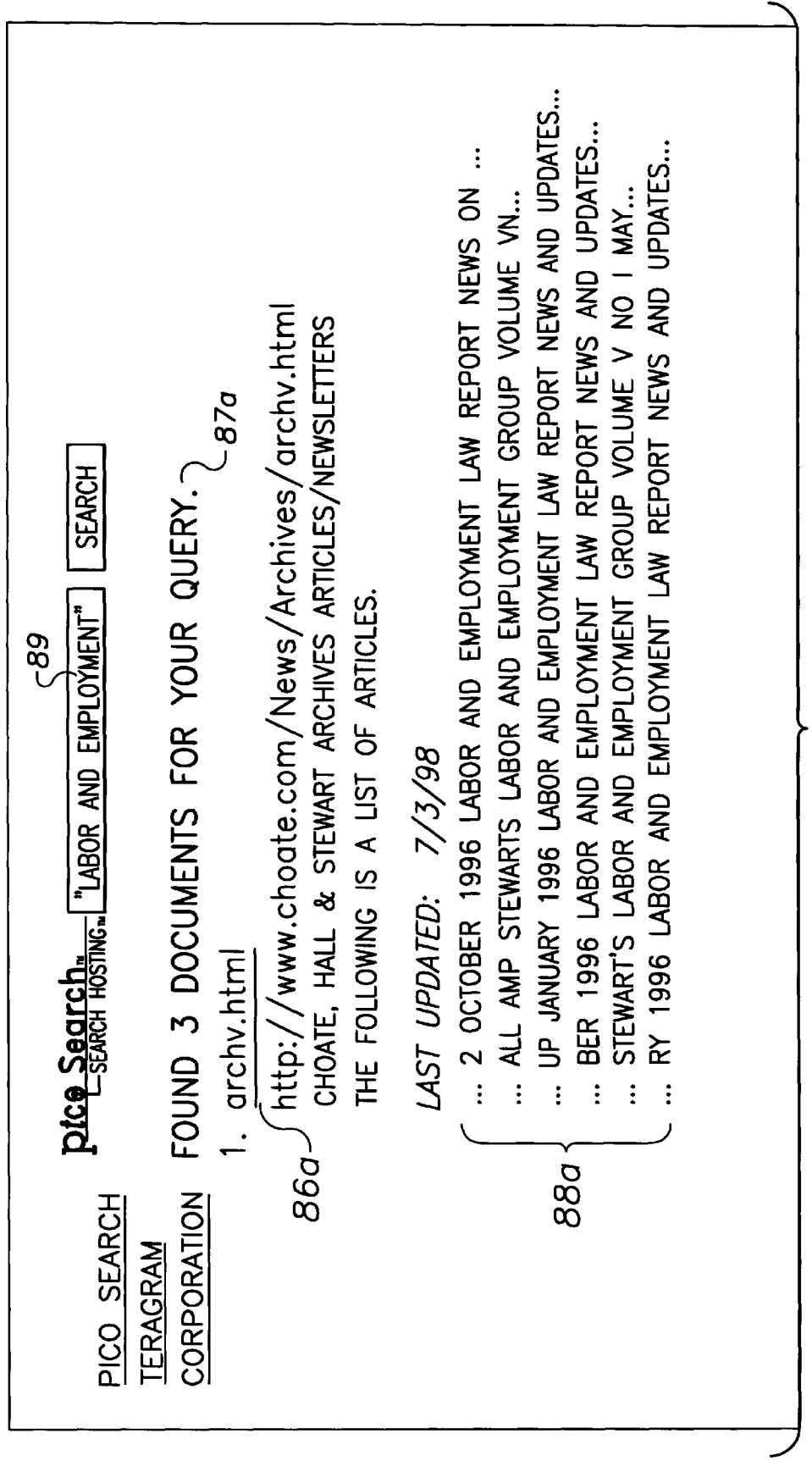
FIG. 12 shows an example of a results page generated by the present invention.
Figure 12B:
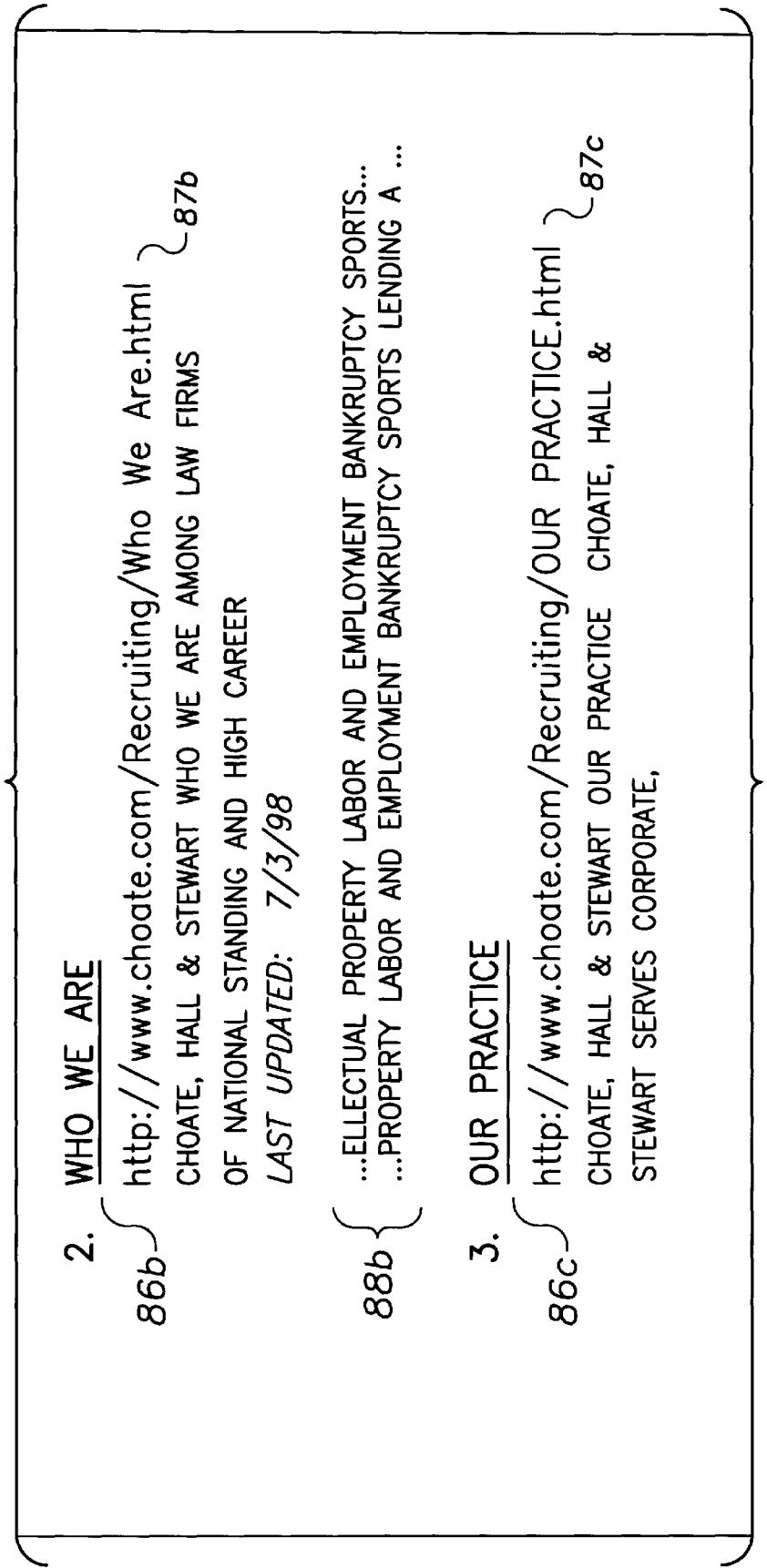

FIG. 12 is an example of a results page generated by the preferred embodiment of the present invention. Specifically, this results page was generated from a search of the Web site shown in FIG. 8, in which the user-specified character string was "labor and employment". As shown in FIG. 12, the results page includes document titles 86a, 86b and 86c, and corresponding URLs 87a, 87b and 87c for each document title. In addition, the results page shown in FIG. 12 includes excerpts 88a, 88b and 88c from each document, which include the user-specified character string. As noted above, however, this feature of the invention is optional, and the results page need not include these excerpts. As also shown in FIG. 12, the results page includes entry line 89, whereby the user may conduct a new search of the Web site shown in FIG. 8 for a new search term.

The present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

```
<!-Begin PicoSearch Code->
<P><FORM METHOD="POST"
ACTION="http://Iwww.picosearch.com/cgi-bin/ts.p1">
<INPUT TYPE="HIDDEN" NAME="index" VALUE="236">
<TABLE BGCOLOR="WHITE" CELLSPACING=0
CELLPADDING=0
BORDER=0><TR><TD>
<TABLE BGCOLOR="WHITE" CELLSPACING=2
CELLPADDING=0
BORDER=0>
<TR><TD><A HREF="http://www.picosearch.com">
<IMG BORDER="0" SRC="http://www.picosearch.com/picosmall.gif"
ALT="PicoSearch"></A ></TD>
<TD><INPUT TYPE="TEXT" NAME="query" VALUE=" "
SIZE="20"></TD>
<TD><INPUT TYPE="SUBMIT"
VALUE="Search"></TD></TR>
</TD></TR></TABLE></TABLE></FORM>
<!-End PicoSearch Code->
```

What is claimed is:

1. A method of configuring a computerized searching system so that the searching system can be used to host searches of a database defined by a database provider, the database comprised of one or more documents, the method comprising the steps of:

receiving, from a database provider or a representative thereof, at a host, information identifying the database;

assigning a provider identifier to the database;

searching through the database using the information received in the receiving step in order to identify documents in the database;

indexing the data in the documents identified in the searching step;

storing, at the host, indexing information generated in the indexing step, together with the provider identifier; and outputting, to the database, code which comprises the provider identifier corresponding to the database and which allows a user to enter user-specified data and to perform a search of the database for the user-specified data without requiring the user to enter the provider identifier corresponding to the database and without requiring the user to enter information identifying the database and without requiring the user to enter information identifying the host.

2. A method according to claim 1, further comprising the steps of:

receiving user-specified data and the provider identifier for the database;

retrieving, from memory, indexing information for the database based on the provider identifier; and identifying documents that contain the user-specified data and appear in a database associated with the provider identifier using the indexing information.

3. A method according to claim 2, wherein the method further comprises the steps of:
  storing, at the host, data corresponding to data in the database, together with the provider identifier, wherein the data corresponding to data in the database is stored in memory in compressed format;
  searching for the user-specified data in the documents identified in the identifying step;
  generating pointers into the compressed data based on the search conducted in the searching step;
  selecting compressed data from memory that corresponds to the provider identifier;
  decompressing segments of the compressed data selected in the selecting step that correspond to the pointers generated in the generating step; and
  outputting the decompressed segments of compressed data, together with a list of documents containing the decompressed segments.

4. A method according to claim 1, wherein the database is accessible on the Internet.

5. A method according to claim 1, wherein the storing step comprises:
  storing an index including data in the documents of the database corresponding to the provider identifier.

6. A method according to claim 5, wherein the index does not include data in documents of databases other than those corresponding to the provider identifier.

7. A method according to claim 5 or claim 6, further comprising the steps of:
  receiving user-specified data and the provider identifier for the database;
  retrieving, from memory, the index corresponding to the provider identifier; and
  identifying documents that contain the user-specified data using the index.

8. A method according to claim 2, further comprising the step of:
  outputting a list of documents identified in the identifying step.

9. An apparatus for configuring a computerized searching system so that the searching system can be used to host searches of a database defined by a database provider, the database comprised of one or more documents, apparatus comprising:
  memory means which stores computer-executable process steps; and
  a processor which executes the process steps so as to:
    receive, from a database provider or a representative thereof, at a host, information identifying the database;
    assign a provider identifier to the database;
    search through the database using the information received in the receiving step in order to identify documents in the database;
    index the data in the documents identified in the searching step;
    store, at the host, indexing information generated in the indexing step, together with the provider identifier; and
    output, to the database, code which comprises the provider identifier corresponding to the database and which allows a user to enter user-specified data and to perform a search of the database for the user-specified data without requiring the user to enter the provider identifier corresponding to the database and without requiring the user to enter information identifying the database and without requiring the user to enter information identifying the host.

10. An apparatus according to claim 9, wherein the processor further executes process steps so as to:
  receive user-specified data and the provider identifier for the database;
  retrieve, from memory, indexing information for the database based on the provider identifier; and
  identify documents that contain the user-specified data using the indexing information.

11. An apparatus according to claim 10, wherein data indexed in the indexing step is stored in memory in compressed format; and
  wherein the processor further executes process steps so as to:
    search for the user-specified data in the documents identified in the identifying step;
    generate pointers into the compressed data based on the search conducted in the searching step;
    select compressed data from memory that corresponds to the provider identifier;
    decompress segments of the compressed data selected in the selecting step that correspond to the pointers generated in the generating step; and
    output the decompressed segments of compressed data, together with a list of documents containing the decompressed segments.

12. An apparatus according to claim 9, wherein the database is accessible on the Internet.

13. An apparatus according to claim 9, wherein the storing step comprises:
  storing an index including data in the documents of the database corresponding to the provider identifier.

14. An apparatus according to claim 13, wherein the index does not include data in documents of databases other than those corresponding to the provider identifier.

15. An apparatus according to claim 13 or claim 14, wherein the processor further executes process steps so as to:
  receive user-specified data and the provider identifier for the database;
  retrieve, from memory, the index corresponding to the provider identifier; and
  identify documents that contain the user-specified data using the index.

16. An apparatus according to claim 10, wherein the processor further executes process steps so as to:
  output a list of documents identified in the identifying step.

17. Computer-executable process steps stored on a computer-readable medium, the computer-executable process steps to configure a computerized searching system so that the searching system can be used to host searches of a database defined by a database provider, the database comprised of one or more documents, the computer-executable process steps comprising:
  code to receive, from a database provider or a representative thereof, at a host, information identifying the database;
  code to assign a provider identifier to the database;
  code to search through the database using the information received by the receiving code in order to identify documents in the database;
  code to index the data in the documents identified by the searching code;

code to store, at the host, indexing information generated by the indexing code, together with the provider identifier; and code to output, to the database, code which comprises the provider identifier corresponding to the database and which allows a user to enter user-specified data and to perform a search of the database for the user-specified data without requiring the user to enter the provider identifier corresponding to the database and without requiring the user to enter information identifying the database and without requiring the user to enter information identifying the host.

18. Computer-executable process steps according to claim 17, further comprising:

code to receive user-specified data and the provider identifier for the database;

code to retrieve, from memory, indexing information for the database based on the provider identifier; and code identify documents that contain the user-specified data using the indexing information.

19. Computer-executable process steps according to claim 18, wherein data indexed in the indexing step is stored in memory in compressed format; and wherein the computer-executable process steps further comprise:

code to search for the user-specified data in the documents identified by the identifying code;

code to generate pointers into the compressed data based on the search conducted in the searching step;

code to select compressed data from memory that corresponds to the provider identifier;

code to decompress segments of the compressed data selected by the selecting code that correspond to the pointers generated in the generating step; and code to output the decompressed segments of compressed data, together with a list of documents containing the decompressed segments.

20. Computer-executable process steps according to claim 17, wherein the database is accessible on the Internet.

21. Computer-executable process steps according to claim 17, wherein the storing code comprises:

code to store an index including data in the documents of the database corresponding to the provider identifier.

22. Computer-executable process steps according to claim 21, wherein the index does not include data in documents of databases other than those corresponding to the provider identifier.

23. Computer-executable process steps according to claim 21 or claim 22, further comprising:

code to receive user-specified data and the provider identifier for the database;

code to retrieve, from memory, the index corresponding to the provider identifier; and code to identify documents that contain the user-specified data using the index.

24. Computer-executable process steps according to claim 18, further comprising:

code to output a list of documents identified by the identifying code.

* * * * *